(12) United States Patent
Lim et al.

(10) Patent No.: US 8,961,207 B2
(45) Date of Patent: Feb. 24, 2015

(54) CARD CONNECTOR

(75) Inventors: Kian Heng Lim, Singapore (SG); Lay Khim Ang, Singapore (SG)

(73) Assignee: Molex Incorporated, Lisle, IL (US)

(*) Notice: Subject to any disclaimer, the term of this patent is extended or adjusted under 35 U.S.C. 154(b) by 148 days.

(21) Appl. No.: 13/567,197

(22) Filed: Aug. 6, 2012

(65) Prior Publication Data

US 2013/0196523 A1 Aug. 1, 2013

(30) Foreign Application Priority Data

Aug. 5, 2011 (SG) ................................ 201105655-3
Aug. 5, 2011 (SG) ................................ 201105656-1

(51) Int. Cl.
*H01R 13/62* (2006.01)

(52) U.S. Cl.
USPC .......................................... 439/159; 439/188

(58) Field of Classification Search
USPC .................. 439/159, 160, 188, 630
IPC .. H01R 13/633,13/635, 12/721; G06K 13/0825
See application file for complete search history.

(56) References Cited

U.S. PATENT DOCUMENTS

| 4,887,188 | A | * | 12/1989 | Yoshida et al. | ........... 361/679.31 |
| 5,275,573 | A | * | 1/1994 | McCleerey | .................. 439/159 |
| 6,270,365 | B1 | | 8/2001 | Nishioka | |
| 6,390,836 | B1 | * | 5/2002 | Motegi et al. | ................. 439/159 |
| 6,976,879 | B2 | * | 12/2005 | Shishikura et al. | ........... 439/630 |
| 7,261,578 | B2 | | 8/2007 | Zhao | |
| 2010/0055985 | A1 | | 3/2010 | Hu et al. | |

FOREIGN PATENT DOCUMENTS

| JP | 2008-108696 A | 5/2008 |
| TW | M359106 U | 6/2009 |

* cited by examiner

*Primary Examiner* — Hien Vu
(74) *Attorney, Agent, or Firm* — Stephen L. Sheldon

(57) ABSTRACT

A card connector includes a main body having a receiving space, a plurality of terminals attached to the main body, a card ejecting mechanism including a levering member pivoted adjacent to the rear of the receiving space and an actuator movable inward and outward, and two detective terminals below the actuator, forming a switching circuit with the actuator for controlling electrical connectivity of the terminals. The actuator is configured to rotate the levering member. When the actuator is at the outward position, the plurality of terminals in enabled; when the actuator is moved beyond a triggering position, the plurality of terminals is disabled.

17 Claims, 25 Drawing Sheets

CARD CONNECTOR

RELATED APPLICATIONS

This application claims priority to Singapore Application No. 201105656-1, filed Aug. 5, 2011, and to Singapore Application No. 201105655-3, filed Aug. 5, 2011, both of which are incorporated herein by reference in their entirety.

FIELD OF THE INVENTION

The present invention relates to a card connector, and relates more particularly to a subscriber identity module (SIM) card connector.

DESCRIPTION OF THE RELATED ART

FIG. 1A shows a conventional SIM card connector 1 disclosed in U.S. Patent Publication No. 2010/0055985A1. The SIM card connector 1 has an insulating housing 11 having a card receiving space, a metal shield 16 assembled to the insulating housing 11, a card receiving mechanism 14 insertable into the card receiving space, a pair of elastic pieces 12 having locking portions 121 for retaining the card receiving mechanism 14, a lengthwise arm 13 having a main portion 131 and two bent flexible arms 132 on opposite ends of the main portion 131, a terminal module 15 disposed in the insulating housing 11 and having a plurality of contacts 151, and a switch element 17 having a movable piece 171 and a stationary piece 172 contacting the movable piece 171 when the card receiving mechanism 14 is not inserted. The elastic piece 12 generates low retaining force, insufficient to retain the card receiving mechanism 14. To hold the card receiving mechanism 14 more securely, the lengthwise arm 13 is introduced.

The lengthwise arm 13 has two bent flexible arms 132 corresponding to the pair of elastic pieces 12. When the card receiving mechanism 14 is inserted, the card receiving mechanism 14 presses the U-shaped portion of each elastic piece 12 and moves the U-shaped portion of each elastic piece 12 outward. The tip of each elastic piece 12 contacts the respective flexible arm 132 so that additional retaining force is applied to the card receiving mechanism 14. However, the SIM card connector 1 uses too many elastic components to retain the card receiving mechanism 14, which takes up too much interior space of the SIM card connector 1. In addition, although employing the lengthwise arm 13 can increase retaining force, these elastic components still are not sufficiently strong to firmly hold the card receiving mechanism 14 and unable to prevent the card receiving mechanism 14 from being accidentally removed.

In addition, the movable piece 171 has an arch portion, which protrudes into the card receiving space to contact an inserted card receiving mechanism 14. When a card receiving mechanism 14 is inserted, the movable piece 171 is pushed away from the stationary piece 172, triggering a card insertion signal. The SIM card connector 1 has another disadvantage. Because the card receiving mechanism 14 moves the movable piece 171, a card insertion signal can bes triggered even if no SIM card is placed in an inserted card receiving mechanism 14, causing unnecessary read/write operations.

FIGS. 1B and 1C show another conventional SIM card connector 2 disclosed in U.S. Pat. No. 6,270,365. The conventional SIM card connector 2 has a housing 20 having an internal housing part for receiving an IC card 22 therein. A slide member 21 having a shaft part slides beside the internal housing part. An eject arm 23 has a shaft hole formed at the center of the eject arm 23. The shaft part of the slide member 21 is fitted into the shaft hole of the eject arm 23 in such a way that allows the eject arm 23 to rotate around the shaft part of the slide member 21. The eject arm 23 has first and second arm parts 23a and 23b extending outward from the disk-like portion of the eject arm 23. The first arm part 23a is provided for engaging the front end of the IC card 22 to rotate the eject arm 23 when the IC card 22 is being inserted. The second arm part 23b has a tip portion having a circular shape for engaging the concave part 221 formed at one side of the IC card 22.

Because the second arm part 23b is moved by swinging motion, the concave part 221 of the IC card 22 must be large so that the second arm part 23b does not interfere with the IC card 22 when the IC card 22 is inserted. However, the large concave part 221 causes an inserted IC card 22 to be loose, as shown in FIG. 1C and unable to be securely held. In addition, the card ejecting and locking mechanism of the conventional SIM card connector 2 includes too many components and is too complex, resulting in high manufacturing cost.

FIG. 2 shows another conventional SIM card connector disclosed in U.S. Pat. No. 7,261,578. Referring to FIG. 2, the conventional SIM card connector 8 comprises an insulating housing 81, a plurality of terminals 82 received in the insulating housing 81, a switch 85, an ejector including a slider 84 and an ejecting member 86, and a shell 83 covering the insulating housing 81. The SIM card connector 8 is a push-push type connector, which has a complex ejector. Usually, a complex ejector includes too many components and leads to high manufacturing cost. Further, the design of the slider 84 is so complex so that the slider 84 should be manufactured by plastic injection molding. The plastic slider 84 is not electrically conductive; therefore, a metal ejecting member 86 is required to cooperate with the switch 85 for enabling the terminals 82. The additional ejecting member 86 increases the cost and complicates the assembly of the SIM card connector 8. Furthermore, the switch 85 has two contact pieces arranged transversely to the moving direction of the slider 84, and such a switch's design cannot be used in a push-pull type connector operated by a mechanism including a rod and a lever.

BRIEF SUMMARY

One embodiment is a card connector that comprises a main body, a plurality of terminals, a card ejecting mechanism, and two detective terminals. The main body comprises a receiving space. The plurality of terminals are attached to the main body. The card ejecting mechanism comprises a levering member and an electrically conductive actuator. The levering member is pivoted adjacent to the rear of the receiving space. The actuator is movable outward and inward and is configured to rotate the levering member. The two detective terminals are disposed below the actuator. The two detective terminals and the actuator form a switching circuit for controlling electrical connectivity of the plurality of terminals. When the actuator is at the outward position, the plurality of terminals are enabled; when the actuator is moved beyond a triggering position, the plurality of terminals are disabled.

Another embodiment is a card connector that comprises a tray, a main body, a plurality of terminals, a card ejecting mechanism, and two detective terminals. The tray comprises a notch. The main body comprises a receiving space for receiving the tray. The plurality of terminals are attached to the main body. The card ejecting mechanism for ejection of the inserted tray comprises a levering member and an electrically conductive actuator. The levering member is pivoted adjacent the rear of the receiving space. The actuator, movable inward and outward, is configured to rotate the levering member. The actuator can comprise a second interacting portion configured to engage with the first interacting portion of the card locking element for linked movement of the card locking element and the actuator. The elastic member can engage the actuator to provide an elastic force counteracting a force moving the actuator inward. The elastic member can provide an elastic force to move to an outward position when the force is removed. The first and second interacting portions allow the movement of the card locking element between the locking position and an unlocking position to be simultaneous with the outward and inward movement of the actuator, and when the actuator is moved to the outward position the card locking element is simultaneously moved to the locking position. In an embodiment, the two detective terminals can be disposed below the actuator. The two detective terminals and the actuator form a switching circuit for controlling electrical connectivity of the plurality of terminals. When the actuator is at the outward position, the plurality of terminals are enabled; when the actuator is moved beyond a triggering position, the plurality of terminals is disabled.

BRIEF DESCRIPTION OF THE DRAWINGS

The present invention is illustrated by way of example and not limited in the accompanying figures in which like reference numerals indicate similar elements and in which.

DETAILED DESCRIPTION

Hereinafter, embodiments are described in detail with reference to the attached drawings. The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity. As can be appreciated, a card connector can comprise a card ejecting mechanism including a levering member and an actuator for ejecting an inserted card or tray. With fewer components to perform ejecting operation, the embodied card connector is simple. The actuator is electrically conductive so that the actuator and the detective terminals can form, in combination, a switching circuit, leading to a simple design due to the use of fewer components. Further, such switching circuit can be applied to any type of connector.

Figure 1A:
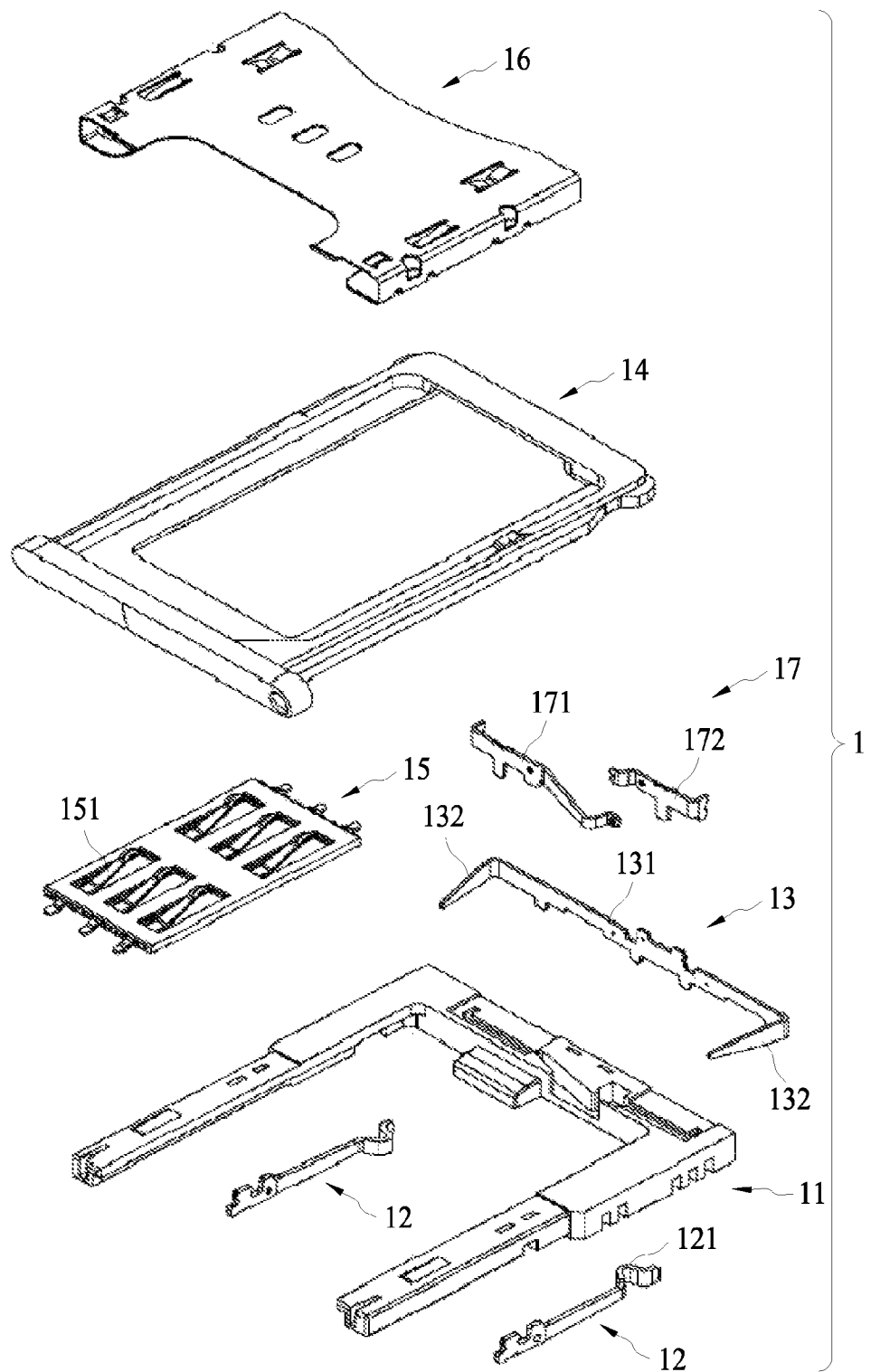
FIG. 1A shows a conventional SIM card connector disclosed in U.S. Patent Publication No. 2010/0055985 A1.
Figure 1B:
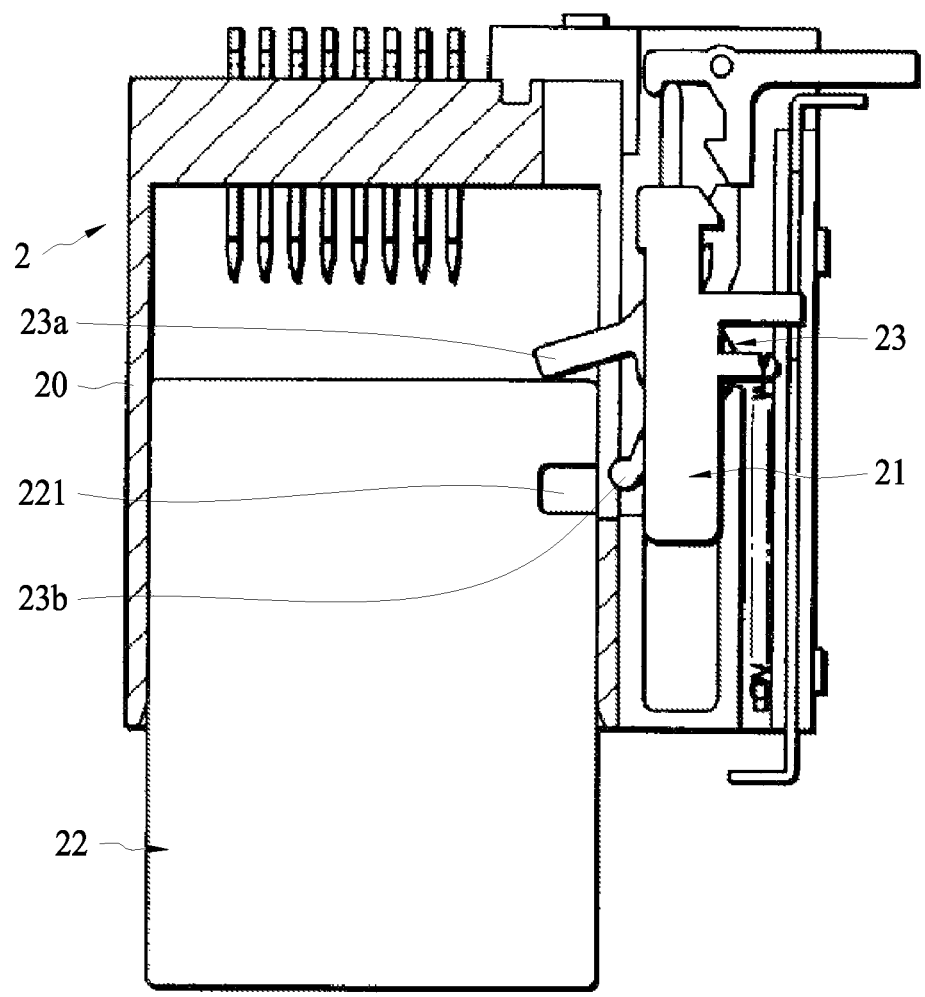
FIGS. 1B and 1C show another conventional SIM card connector disclosed in U.S. Pat. No. 6,270,365.
Figure 1C:
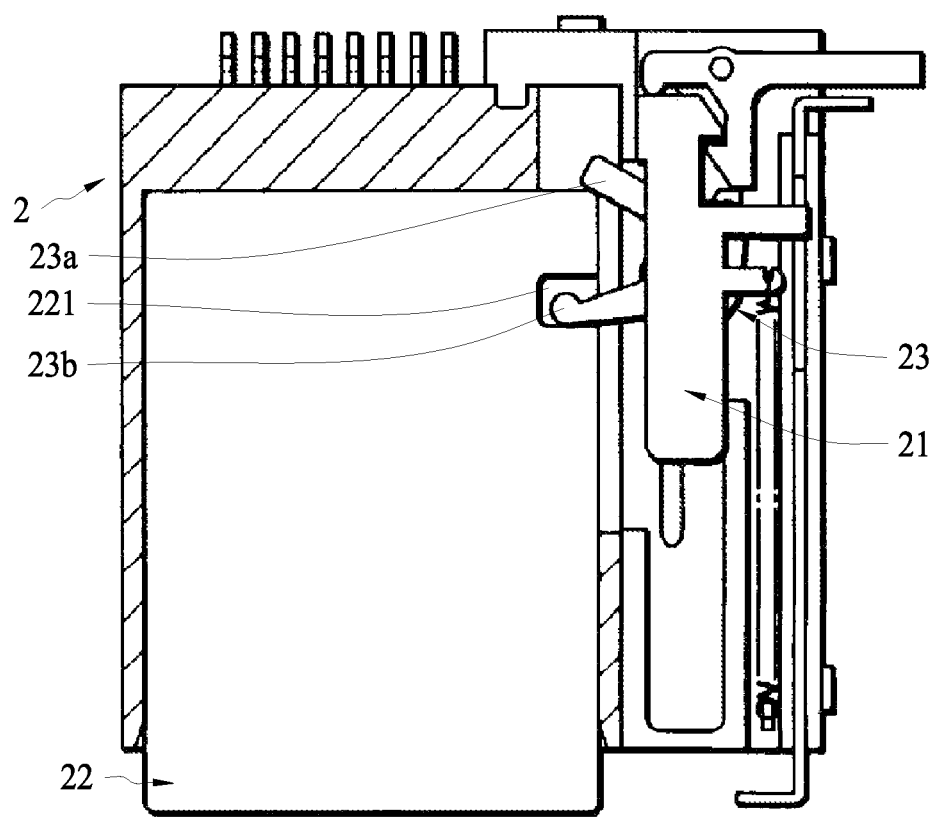
Figure 2:
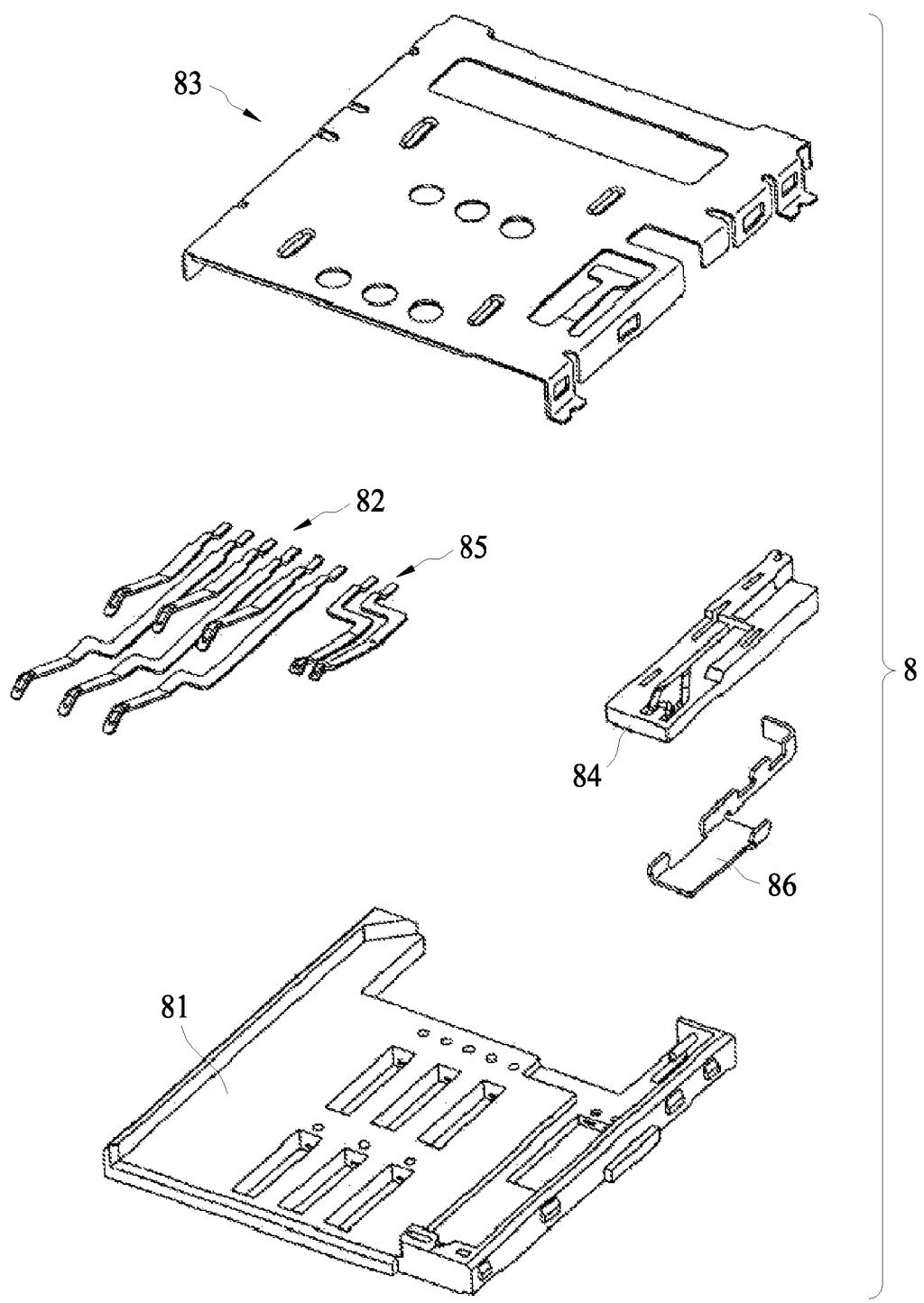
FIG. 2 shows another conventional SIM card connector disclosed in U.S. Pat. No. 7,261,578.
Figure 3:
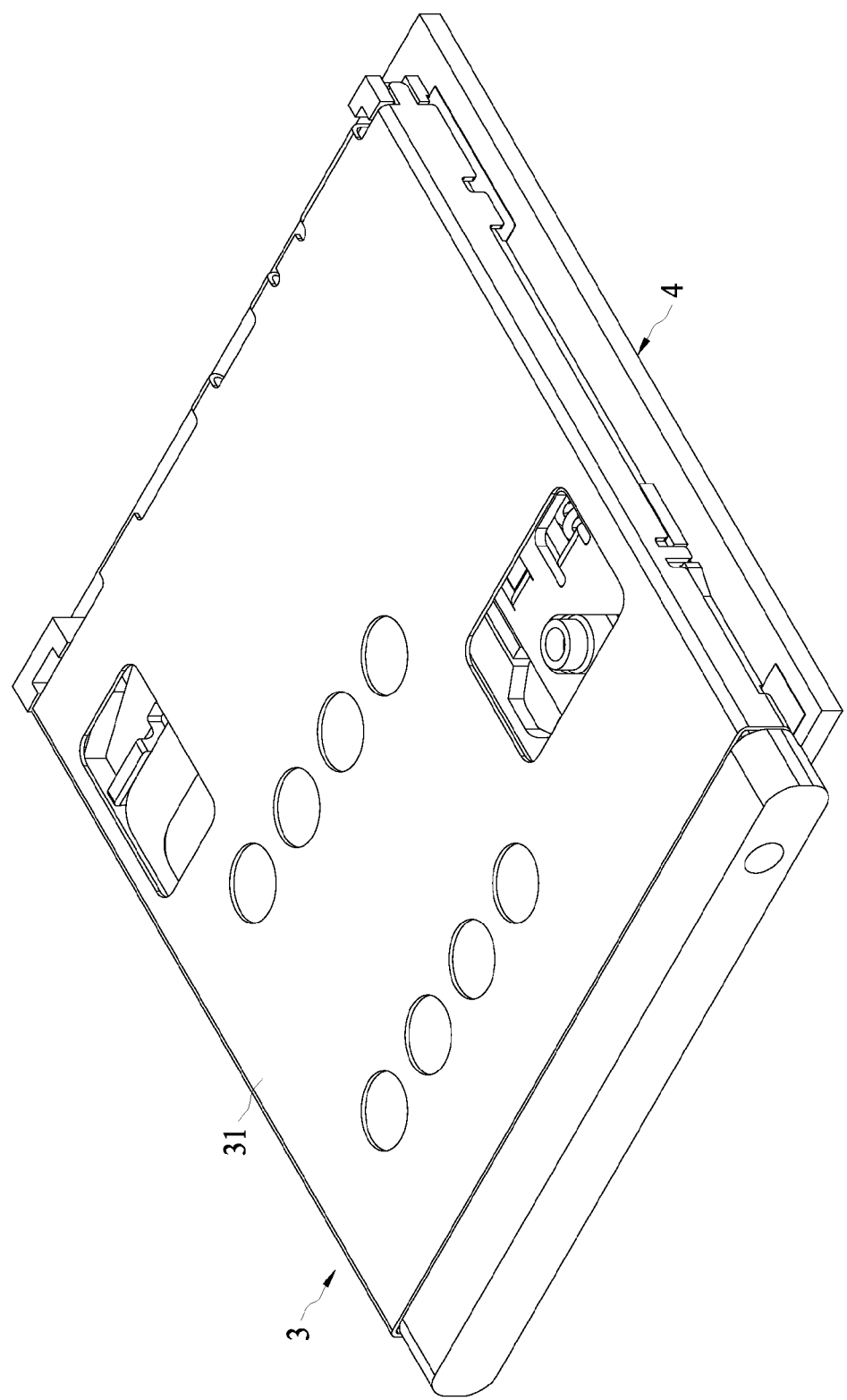
FIG. 3 is a perspective view showing a card connector mounted on a printed circuit board according to one embodiment of the present invention.
Figure 4:
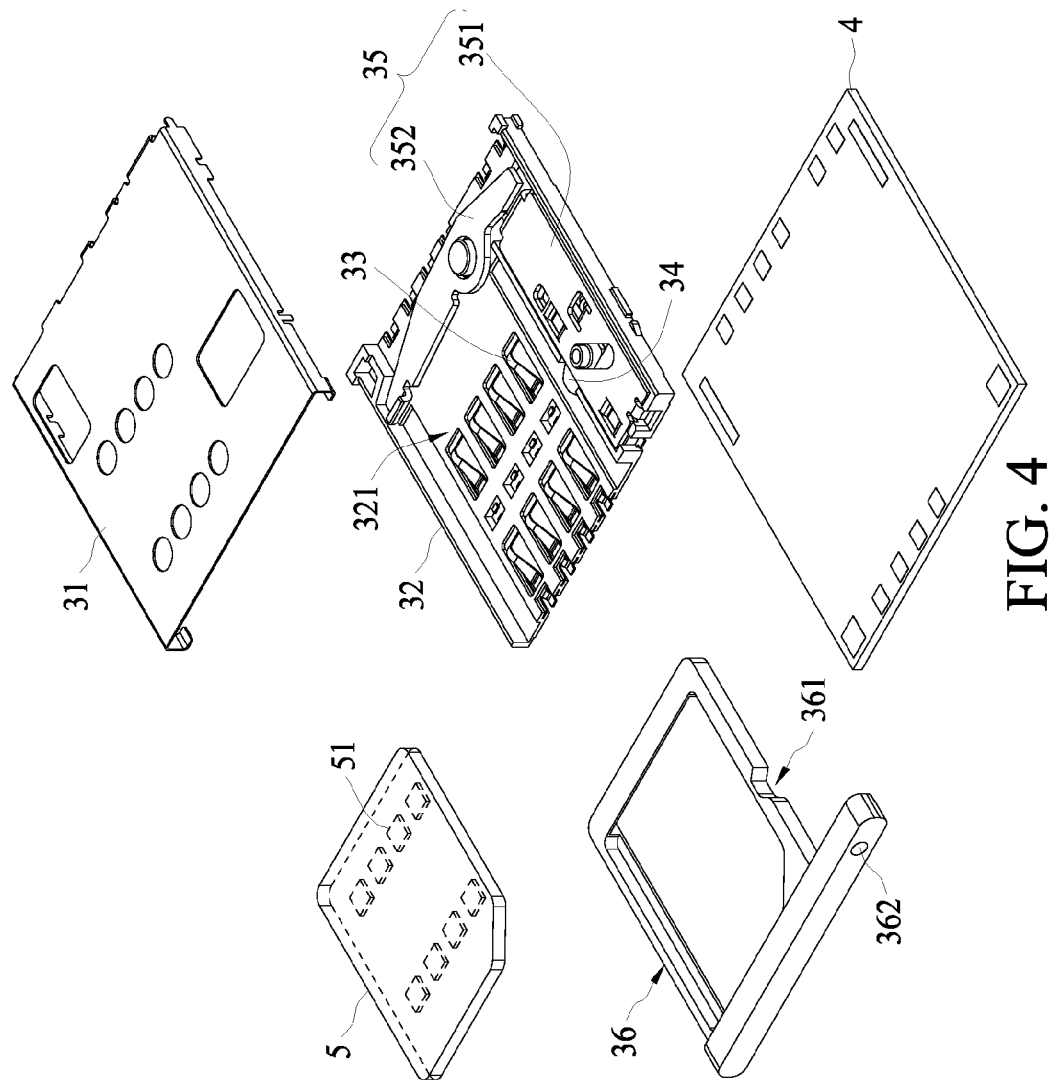
FIG. 4 is an exploded perspective view showing the components of the card connector of FIG. 3.
Figure 5:
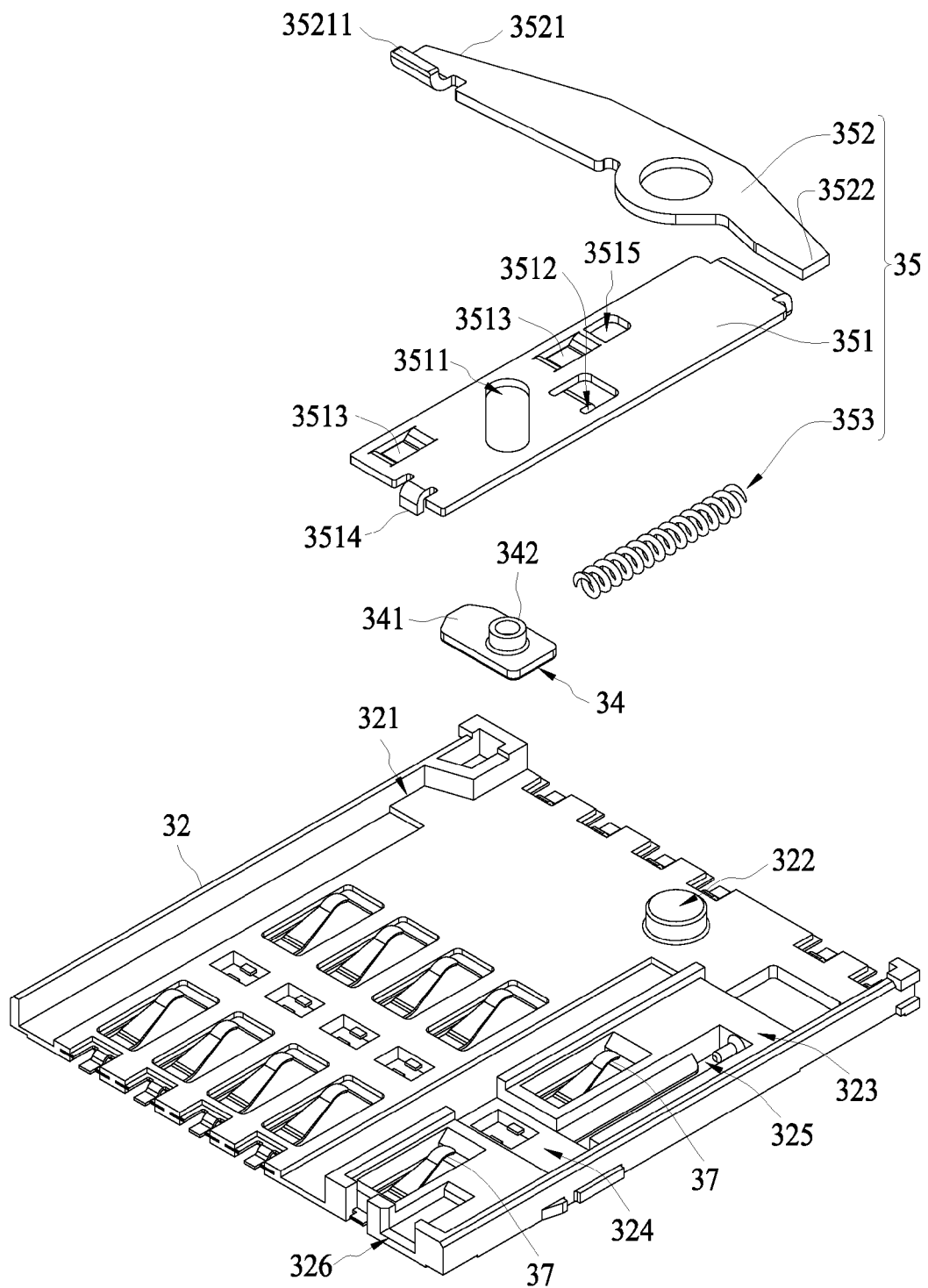
FIG. 5 is an exploded perspective view showing a card locking element and a card ejecting mechanism according to one embodiment of the present invention.

FIG. 3 is a perspective view showing a card connector 3 according to one embodiment of the present invention. FIG. 4 is an exploded perspective view showing a card connector 3, a printed circuit board 4, and an electrical card 5 according to one embodiment of the present invention. FIG. 5 is an exploded view showing a card ejecting mechanism 35 and a card locking element 34 according to one embodiment of the present invention. As shown in FIGS. 3 to 5, the card connector 3, configured to be mountable on a printed circuit board 4, may comprise a main body 32 formed with a receiving space 321 for receiving an inserted tray 36, a plurality of terminals 33 attached to (for example, insert molded with) the main body 32, a card locking element 34 for locking an inserted tray 36, a card ejecting mechanism 35 configured for the ejection of an inserted tray 36, and two detective terminals 37.

As shown in FIG. 5, the card locking element 34 includes a locking portion 341, which is configured to be located in the receiving space 321 when the card locking element 34 is in a locking position. The card ejecting mechanism 35 is configured to cooperate with the card locking element 34. The card ejecting mechanism 35 may comprise an electrically conductive actuator 351 that can be made of metal and movable in an outward and inward direction, a levering member 352 mounted adjacent to the rear of the receiving space 321 and engageable with the actuator 351, and an elastic member 353 configured to be engageable with the actuator 351. The two detective terminals 37 are disposed below the actuator 351, forming a switching circuit with the actuator 351 for controlling electrical connectivity of the plurality of terminals 35.

In one embodiment, the card locking element 34 can be rigid, not elastic, so that an inserted tray 36 can be firmly held. In an embodiment, the card connector 3 can also receive an electrical card that is configured to be directly inserted in the card connector 3. In particular, the card connector 3 further comprises a cover member 31, and when the cover member 31 is attached to the main body 32, the actuator 351 and levering member 352 are confined between the cover member 31 and the main body 32.

Specifically, the levering member 352, pivoted on a pivot 322, comprises a first arm part 3521 and a second arm part 3522. The first arm part 3521 extends transversely at the rear of the main body 32 and includes an end portion 35211 that can be moved into the receiving space 321 to eject an inserted tray 36. The end portion 35211 of the first arm part 3521 can further be configured to include a tab. The first arm part 3521 can contact the tray 36 when the levering member 352 is rotated to eject the tray 36 or when a tray 36 is inserted into the receiving space 321. The second arm part 3522 extends adjacent to the actuator 351 so that the actuator 351 can push the second arm part 3522, rotate the levering member 352, and move the first arm part 3521 to push an inserted tray 36 outward during a card ejection process.

Figure 8:
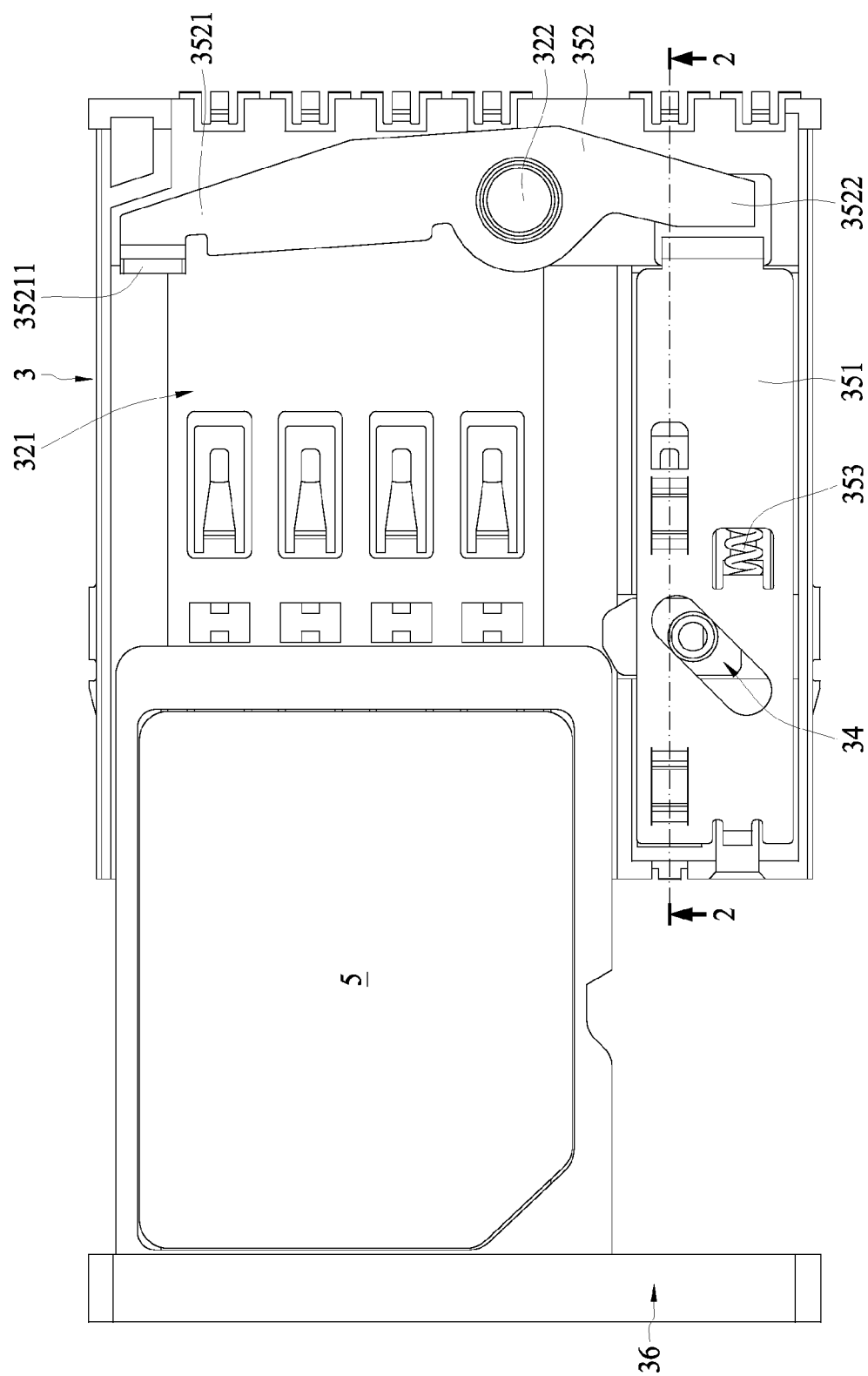
FIG. 8 is a top view showing a tray with an electrical card being inserted to a triggering position according to one embodiment of the present invention.
Figure 12:
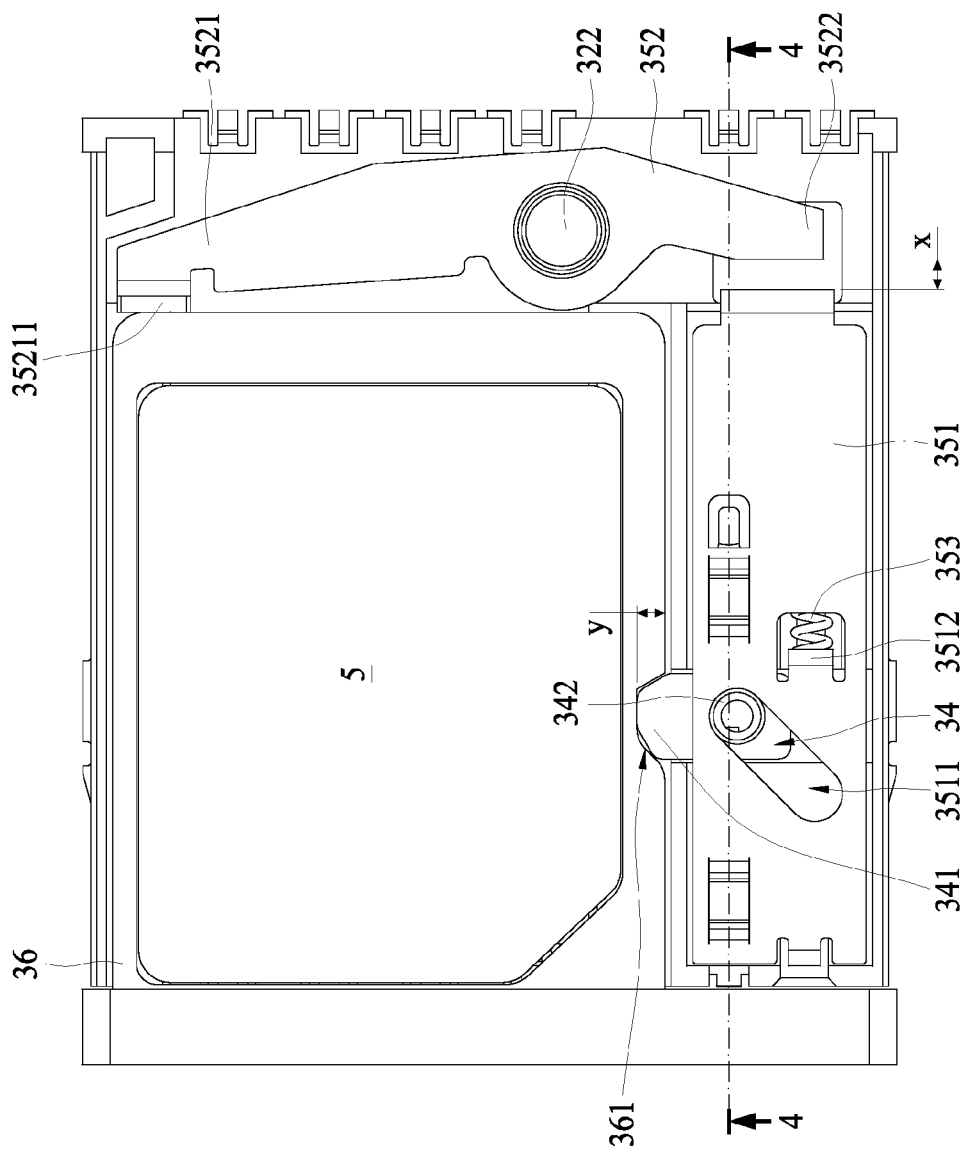
FIG. 12 is a top view showing a completely inserted tray with an electrical card according to one embodiment of the present invention.
Figure 18:
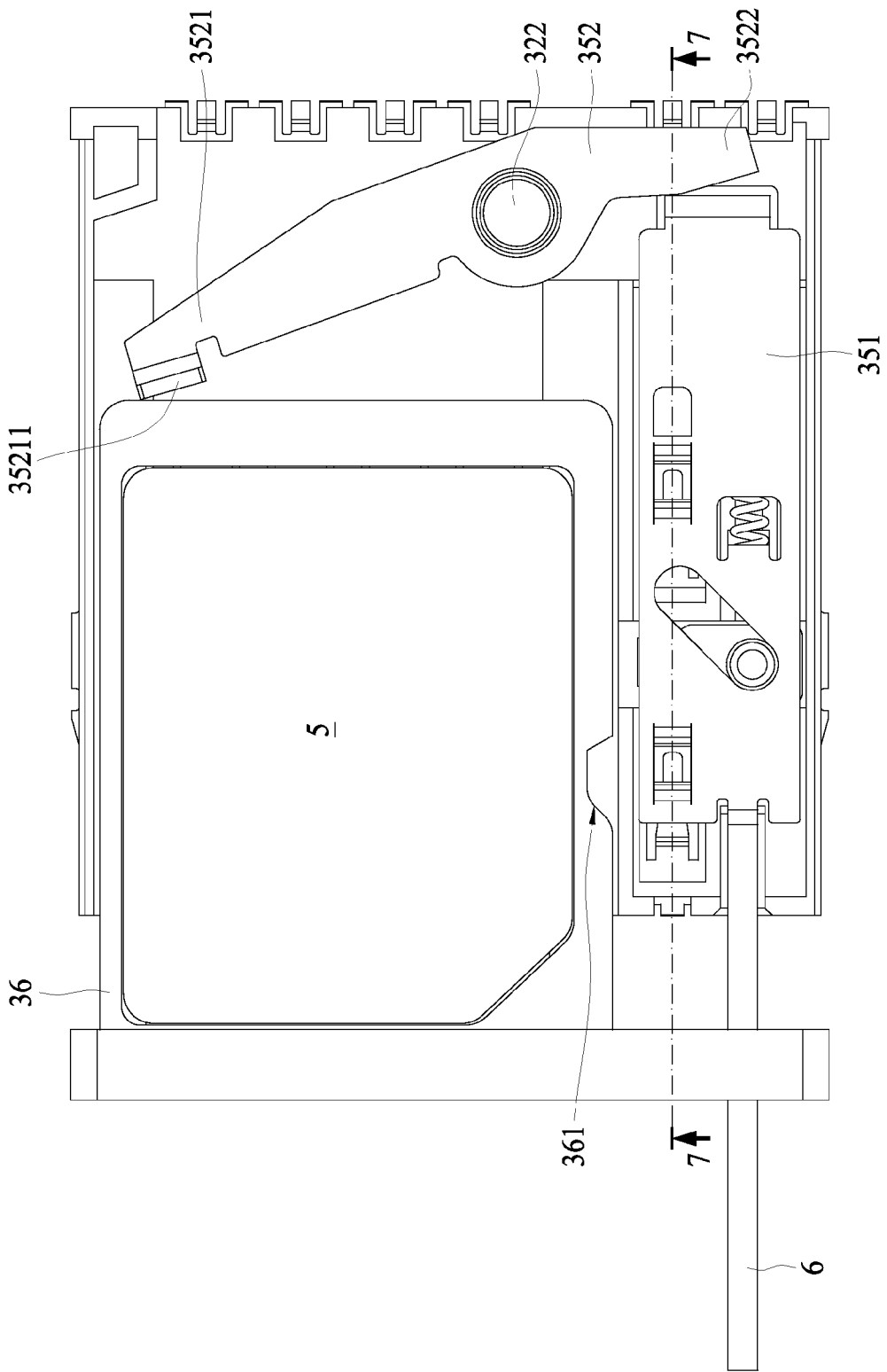
FIG. 18 is a top view showing a tray with an electrical card that is completely ejected according to one embodiment of the present invention.

Specifically, as shown in FIGS. 8 and 18, the levering member 352 is configured to rotate between a first position as shown in FIG. 8 or 12 and a second position as shown in FIG. 18 for ejection of the inserted tray. During an ejection process, the levering member 352, rotated by the actuator 351 moved by a push member 6 after its second arm part 3522 engages one end portion of the actuator 351, pushes an inserted tray 36 outward with its end portion 35211 until the levering member 352 is rotated to the second position. At the second position, the first arm part 3521 partially extends in the receiving space. Alternatively, during an insertion process, an inserting tray 36 pushes the end portion 35211 of the second arm part 3522 of the levering member 352, rotating the levering member 352 until the tray 36 is completely inserted, and at this moment the levering member 352 is at the first position.

Figure 6:
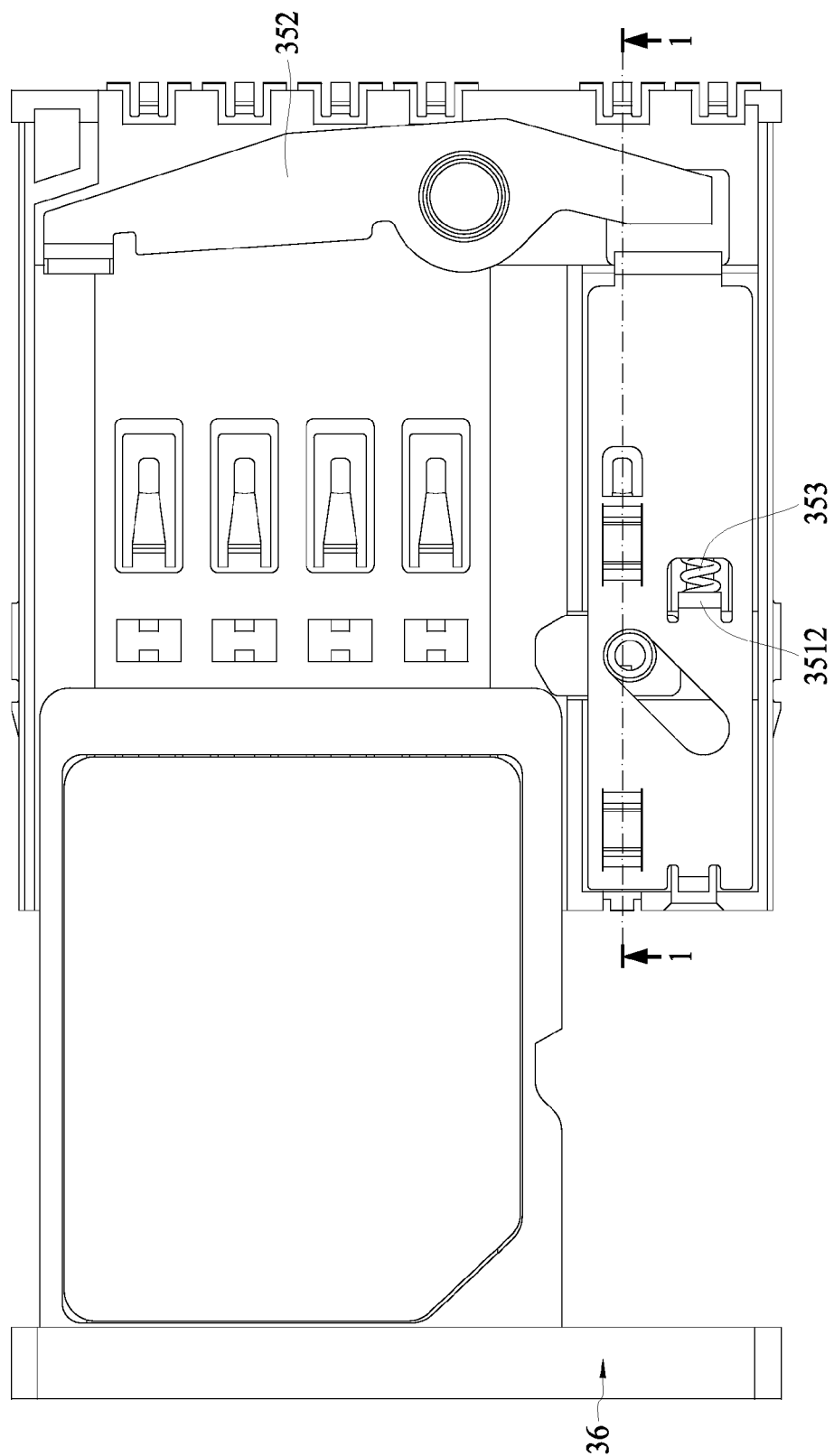
FIG. 6 is a top view showing a tray with an electrical card being inserted into the receiving space of a card connector according to one embodiment of the present invention.

The actuator 351 can be moved to an inward position as shown in FIG. 18 or an outward position as shown in FIG. 6 or 12. The actuator 351 can move along a direction parallel to the insertion direction of the tray 36. The actuator 351 can be used to move the card locking element 34. The card locking element 34 may include a first interacting portion 342, and the actuator 351 may include a second interacting portion 3511. The first and second interacting portions 342 and 3511 are engaged for linked movement of the card locking element 34 and the actuator 351, allowing the movement of the card locking element 34 between the locking position and an unlocking position to be simultaneous with the inward and outward movement of the actuator 351. When the actuator 351 is moved to the outward position, the card locking element 34 is simultaneously moved to the locking position. The interaction of the first and second interacting portions 342 and 3511 can cause the card locking element 34 and the actuator 351 to move in different directions, for example, two perpendicular directions.

In particular, when the card locking element 34 is in a locking position, the locking portion 341 of the card locking element 34 is in the notch 361 (FIG. 4) formed on an inserted tray 36, and when the card locking element 34 is in an unlocking position, the locking portion 341 of the card locking element 34 is removed out of the notch 361 of the tray 36 so that the locking portion 341 does not obstruct the movement of the inserted tray 36 in the receiving space 321.

More specifically, as shown in FIG. 12, to operate smoothly, the card connector 3 can be configured such that the distance "x" between the second arm part 3522 of the levering member 352 at the first position and the actuator 351 is greater than a moving distance "y" of the card locking element 34 from the locking position to the unlocking position where the locking portion 341 does not obstruct the movement of the inserted tray 36 in the receiving space 321.

As shown in FIG. 5, in one embodiment, the first interacting portion 342 of the card locking element 34 comprises a pin, and the second interacting portion 3511 of the actuator 351 comprises a slot inclined at an angle, such as 45 degrees, relative to the moving direction of the actuator 351. The slot has two elongated slot edges. When the actuator 351 is moved, one elongated slot edge contacts the pin, pushing the pin to move along the same elongated slot edge so as to move the card locking element 34. Alternatively, when the pin is moved, the pin pushes another elongated slot edge, moving along the same elongated slot edge so as to move the actuator 351.

As shown in FIG. 5, the elastic member 353 is configured to be engageable with the actuator 351 to provide an elastic force counteracting a force moving the actuator 351 inward, and to move the actuator 351 outward when the force is removed. In one embodiment, the elastic member 353 comprises a spring.

In particular, as shown FIGS. 5 and 6, the actuator 351 comprises a projecting piece 3512 configured to be contactable with the elastic member 353 so that when the actuator 351 is moved inward the projecting piece 3512 can compress the elastic member 353. The main body 32 is further provided with a channel 325 for receiving the elastic member 353. The channel 325 is defined by one end wall against which one end of the elastic member 353 can abut.

As shown in FIGS. 4 and 5, the main body 32 comprises a first recessed area 323 and a second recessed area 324. The first recessed area 323 is configured for confining the actuator 351 to moving inward and outward. The second recessed area 324 is configured for confining the movement of the card locking element 34. The first recessed area 323 can be disposed adjacent to a side of the main body 32. The second recessed area 324 can traverse the first recessed area 323.

Figure 7:
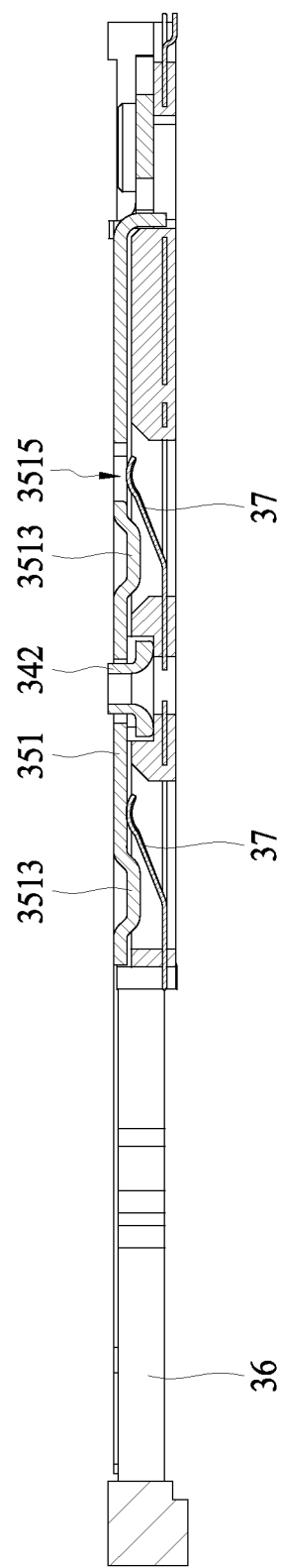
FIG. 7 is a sectional view along line 1-1 of FIG. 6.
Figure 9:
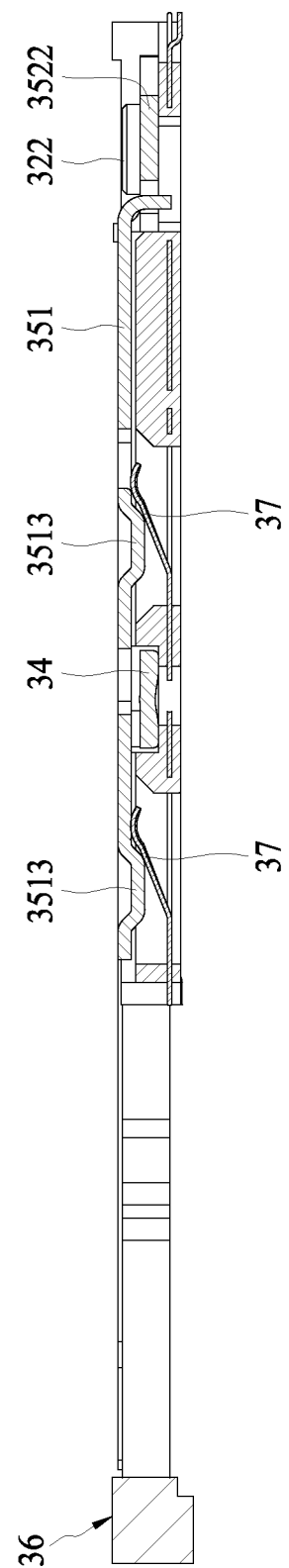
FIG. 9 is a sectional view along line 2-2 of FIG. 8.

As shown in FIGS. 5 and 7, two detective terminals 37 are disposed below the actuator 351 made of electrically conductive material such as metal and form a switch circuit with the actuator 351 for controlling the electrical connectivity of the plurality of terminals 33. When the actuator 351 is at the outward position, the plurality of terminals 33 can be enabled. In the moving path of the actuator 351, there is a triggering position (as shown in FIG. 9) where the engagement status between the detective terminals 37 and the actuator 351 is changed when the actuator 351 passes through it. It is worth mentioning that before the actuator 351 is moved to the triggering position, the plurality of terminals 33 may be enabled, and when the actuator 351 is moved beyond the triggering position, the plurality of terminals 33 can be disabled, thereby preventing the electrical card 5 from being damaged.

As shown in FIGS. 6 and 7, in one embodiment, the two detective terminals 37 can be disposed along a direction parallel to the moving direction of the actuator 351.

In particular, as shown in FIG. 4, the electrical card 5 comprises a plurality of contact pads 51. When the electrical card 5 is being inserted, the contact pads 51 do not contact plurality of terminals 33 before the actuator 351 is moved beyond the triggering position during the inward movement of the actuator 351. When the electrical card 5 is completely inserted, all contact pads 51 contact the respective terminals 33, and the card locking element 34 encounters the notch 361 of the tray 36. At the moment, the elastic member 353 starts to move the actuator 351 outward, and simultaneously moves the card locking element 34 into the notch 361. During the outward movement of the actuator 351, the terminals 33 are enabled after the actuator 351 is moved past the triggering position.

Alternatively, when the electrical card 5 is being ejected, the electrical card 5 does not move before the actuator 351 is moved beyond the triggering position during the inward movement of the actuator 351. During the outward movement of the actuator 351, the contact pads 51 of the electrical card 5 disengage from the plurality of terminals 33 before the actuator 351 is moved past the triggering position.

In one embodiment, the actuator 351 comprises two protruding portions 3513 corresponding to the detective terminals 37. The actuator 351 disengages from at least one of the detective terminals 37 and the plurality of terminals 33 are enabled when the actuator 351 is at the outward position, and the protruding portions 3513 of the actuator 351 correspondingly contact the detective terminals 37, forming a loop circuit, and the plurality of terminals 33 are disabled when the actuator 351 is moved beyond the triggering position. The protruding portions 3513 of the actuator 351 continue to contact the detective terminals 37 and the plurality of terminals 33 remain disabled with the actuator 351 moving inward beyond the triggering position.

Furthermore, the actuator 351 may comprise an opening 3515 disposed corresponding to one detective terminal 37. The opening 3515 is configured to ensure that the corresponding detective terminal 37 does not contact the actuator 351 when the actuator 351 at the outward position as shown in FIG. 7.

Figure 13:
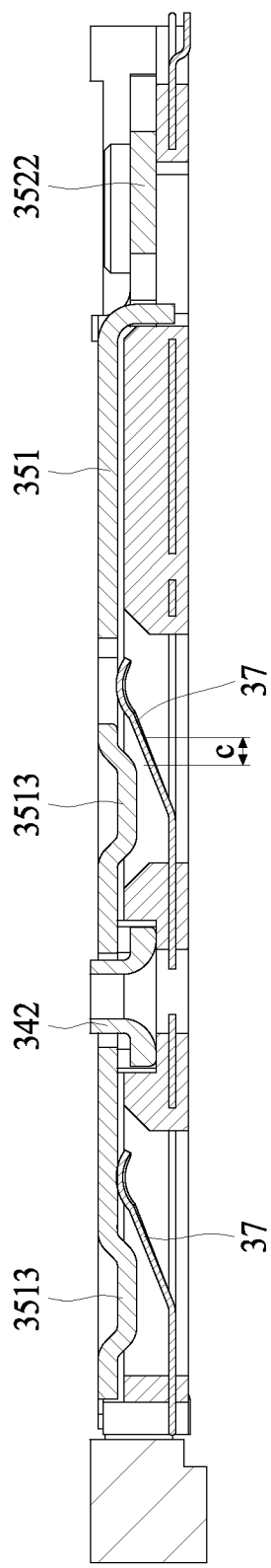
FIG. 13 is a sectional view along line 4-4 of FIG. 12.

As shown in FIGS. 12 and 13, the card connector 3 is configured in such a way that the plurality of terminals 33 are disabled before the levering member 352 pushes an inserted tray 36 outward. To this end, the distance "c" between the outward position of the actuator 351 and the triggering position is not greater than the distance "x" between the second arm part 3522 and the actuator 351. To avoid the removal of the electrical card 5 before the terminals 33 are disabled, the distance "c" is not greater than the moving distance "y".

FIGS. 8 to 13 are used to demonstrate the insertion process of a tray 36 carrying an electrical card 5 into a card connector 3 according to one embodiment of the present invention. FIGS. 8 and 9 show that a tray 36 carrying an electrical card 5 is inserted in the receiving space 321 to the triggering position. At the triggering position, the protruding portions 3513 start to contact corresponding detective terminals 37 and the tray 36 may contact the card locking element 34 at a cut corner, pushing the card locking element 34 slightly outward; meanwhile the actuator 351 is simultaneously moved slightly inward, and the elastic member 353 is simultaneously compressed. As can be seen, at the triggering position, the contact pads 51 on the electrical card 5 do not contact the plurality of terminals 33.

Figure 10:
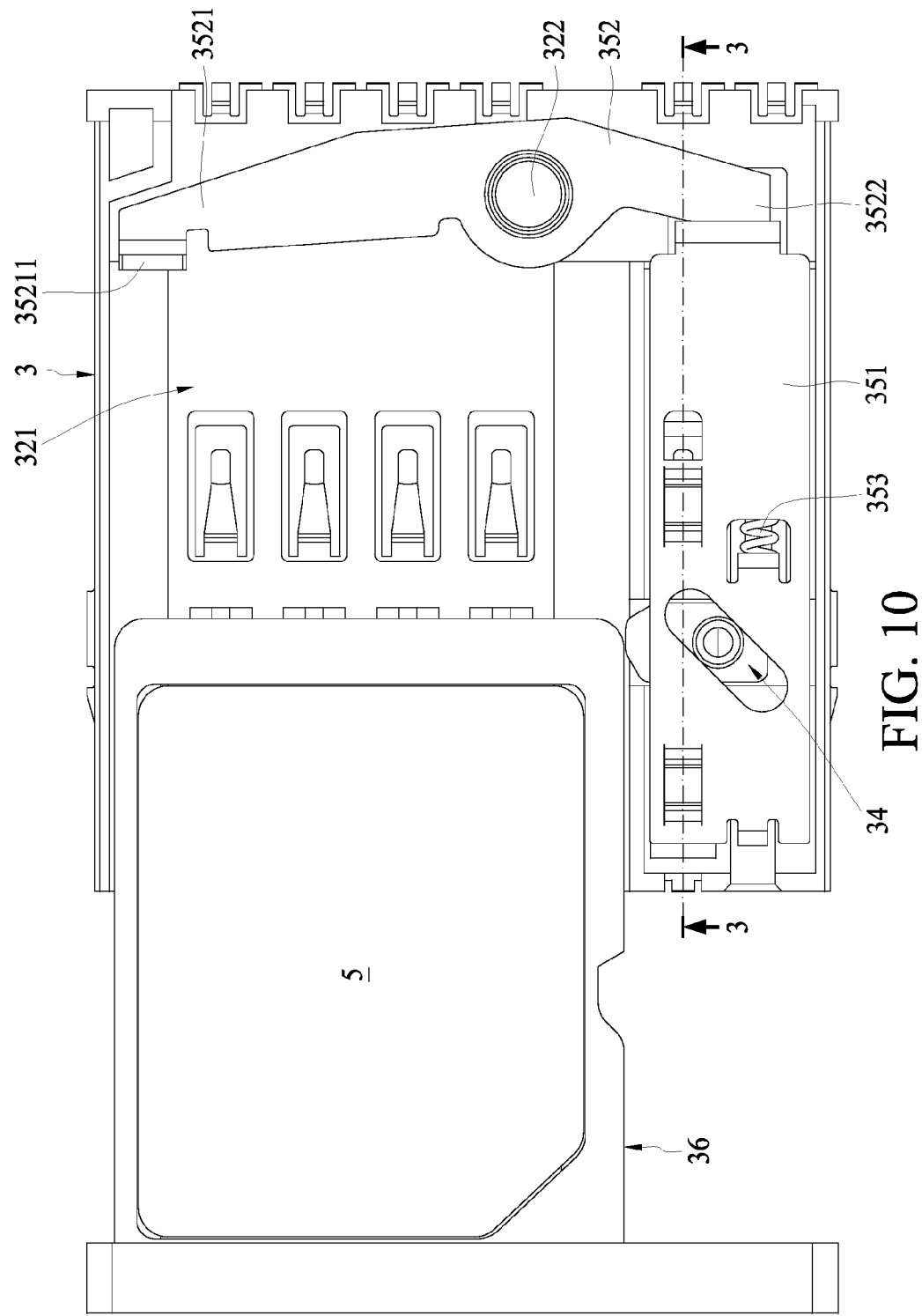
FIG. 10 is a top view showing the position of an actuator when the card locking element is moved to a position where the leading edge of the card locking element pushes a side of an inserting tray according to one embodiment of the present invention.
Figure 11:
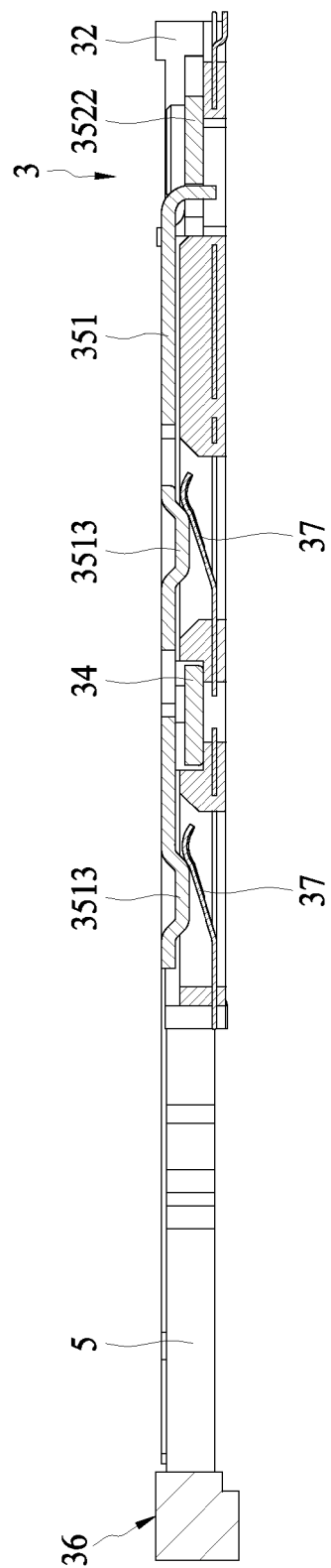
FIG. 11 is a sectional view along line 3-3 of FIG. 10.

As shown in FIGS. 10 and 11, the tray 36 continues to be moved in, the actuator 351 is moved past the triggering position, the actuator 351 continues to contact the detective terminals 37, and the plurality of terminals 33 remain disabled. At some moment, the card locking element 34 is moved away from the insertion path of the tray 36 and pushes against a side of the tray 36 with its leading edge, and the actuator 351 may be moved very closely to the second arm part 3522 of the levering member 352, for example, less than 0.1 mm from the second arm part 3522.

As shown in FIGS. 12 and 13, when the tray 36 is completely inserted, the card locking element 34 meets the notch 361 of the tray 36, and is no longer able to push against the tray 36. Without a counterforce, the actuator 351 is moved outward by the elastic force produced by the compressed elastic member 353, and with the cooperation between the first interacting portion 342 and the second interacting portion 3511, the card locking element 34 is simultaneously moved inward, bringing the locking portion 341 into the notch 361 of the tray 36. Finally, the elastic member 353 pushes the actuator 351 back to the outward position, and the card locking element 34 is at the locking position.

Figure 14:
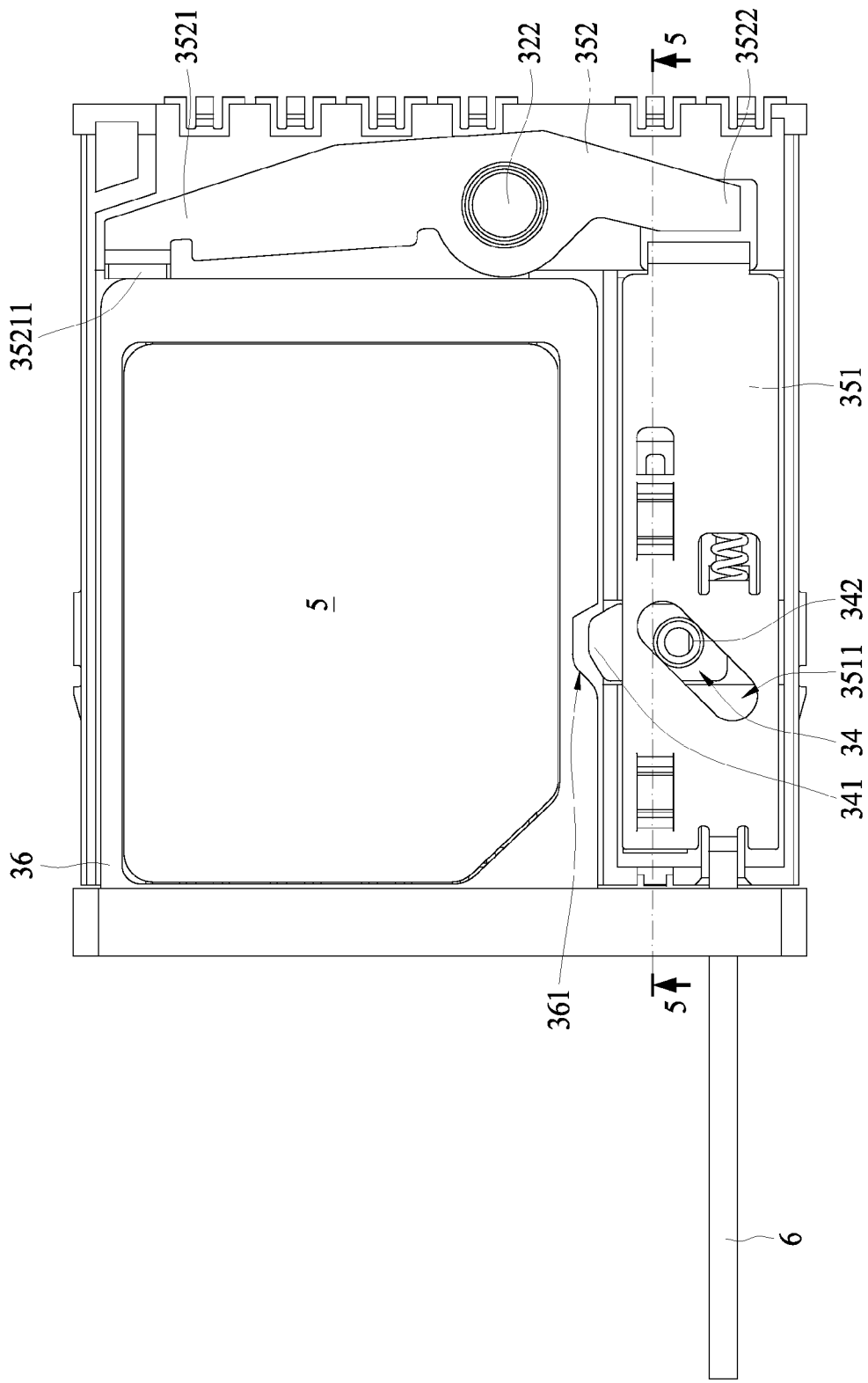
FIG. 14 is a top view showing a push member applied to eject an inserted tray with an electrical card, moving the actuator to a triggering position according to one embodiment of the present invention.
Figure 15:
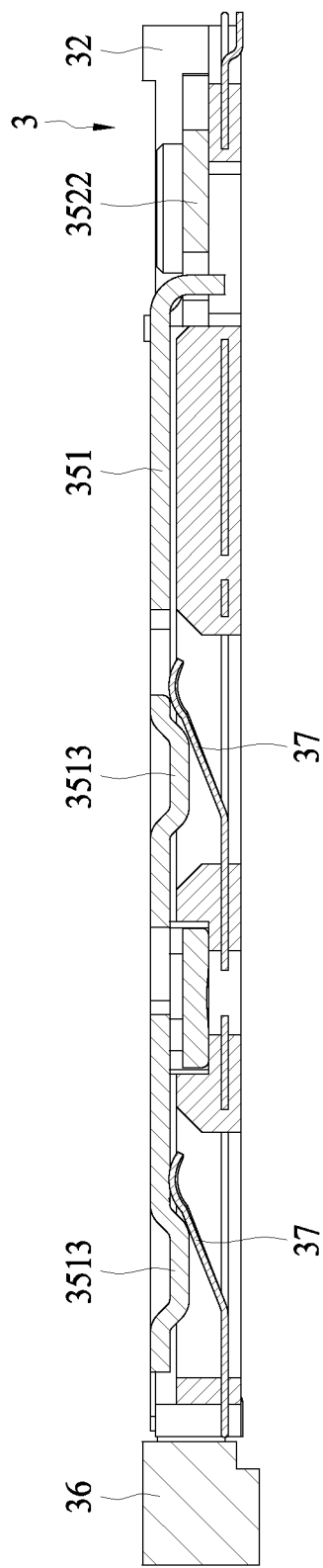
FIG. 15 is a sectional view along line 5-5 of FIG. 14.

FIGS. 14 to 19 are used to demonstrate the ejection process of a tray 36 carrying an electrical card 5 out of a card connector 3 according to one embodiment of the present invention. As shown in FIGS. 14 and 15, a push member 6 is applied to move the actuator 351 inward, the locking portion 341 of the card locking element 34 is moved from the notch 361 to unlock the tray 36, and the levering member 352 is rotated to push the tray 36 outward.

As shown in FIGS. 4 and 5, the main body 32 has an opening 326 formed to expose a front bent portion 3514 of the actuator 351, and the tray 36 has another opening 362 corresponding to the opening 326 of the main body 32. The push member 6 such as a pin can be inserted through the openings 326 and 362 to push the front bent portion 3514 of the actuator 351, moving the actuator 351 inward. As the actuator 351 is moved inward, the cooperation of the first interacting portion 342 and the second interacting portion 3511 causes a simultaneous movement of the card locking element 34, moving the locking portion 341 of the card locking element 34 out of the notch 361 of the tray 36. When the actuator 351 is moved to the triggering position (as shown in FIG. 15), the protruding portions 3513 contact corresponding detective terminals 37, disabling the plurality of terminals 33. At the triggering position, the locking portion 341 of the card locking element 34 may be partially removed from the notch 361 of the tray 36. At the moment, the electrical card 5 has not been moved yet.

Figure 16:
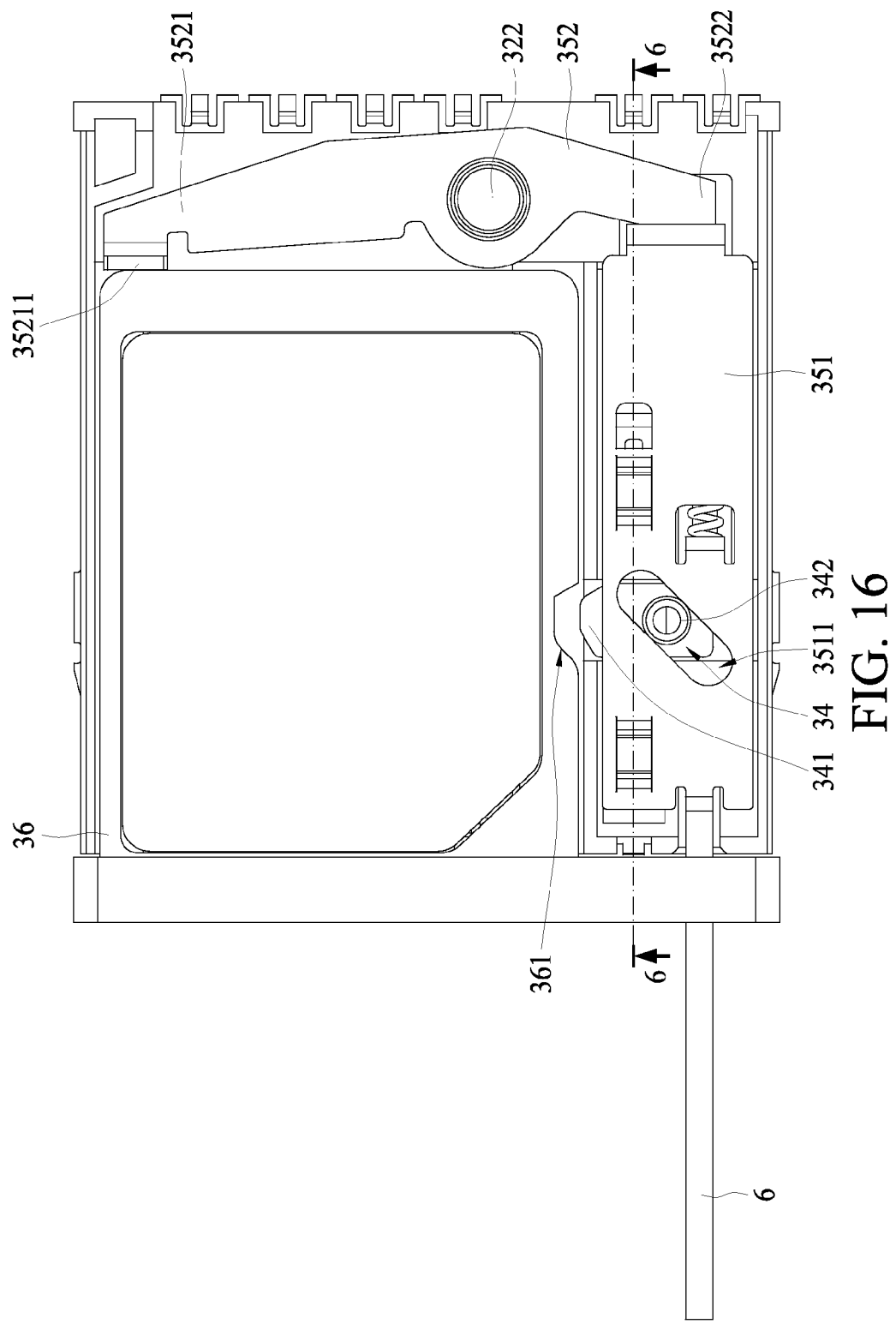
FIG. 16 is a top view showing the position of the card locking element when the actuator is moved proximately to the levering member according to one embodiment of the present invention.
Figure 17:
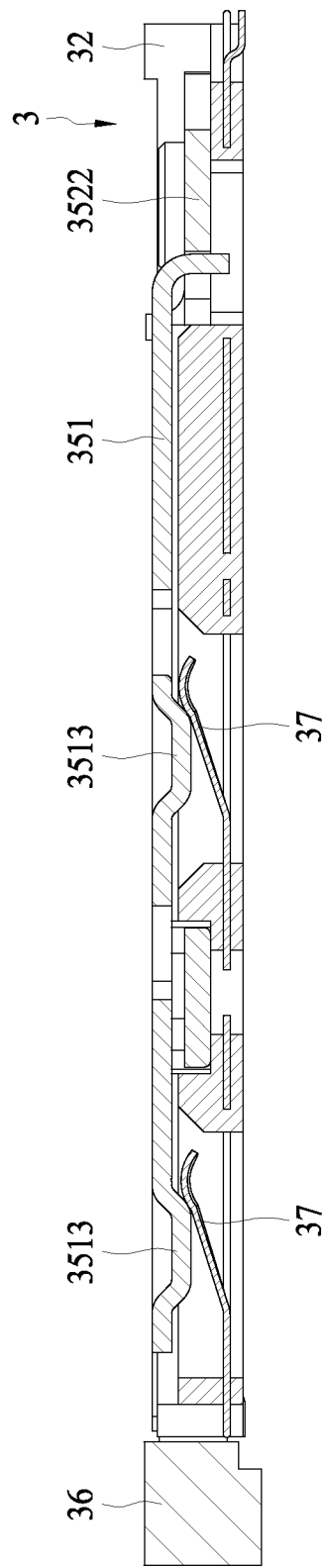
FIG. 17 is a sectional view along line 6-6 of FIG. 16.

As shown in FIGS. 16 and 17, as the push member 6 continues to push the actuator 351, the locking portion 341 of the card locking element 34 can be moved out of the notch 361 of the tray 36, and the actuator 351 can be moved to an engaging position where the actuator 351 starts to contact the second arm part 3522 of the levering member 352. Preferably, the locking portion 341 of the card locking element 34 is completely moved out of the notch 361 before the actuator 351 contacts the levering member 352.

Figure 19:
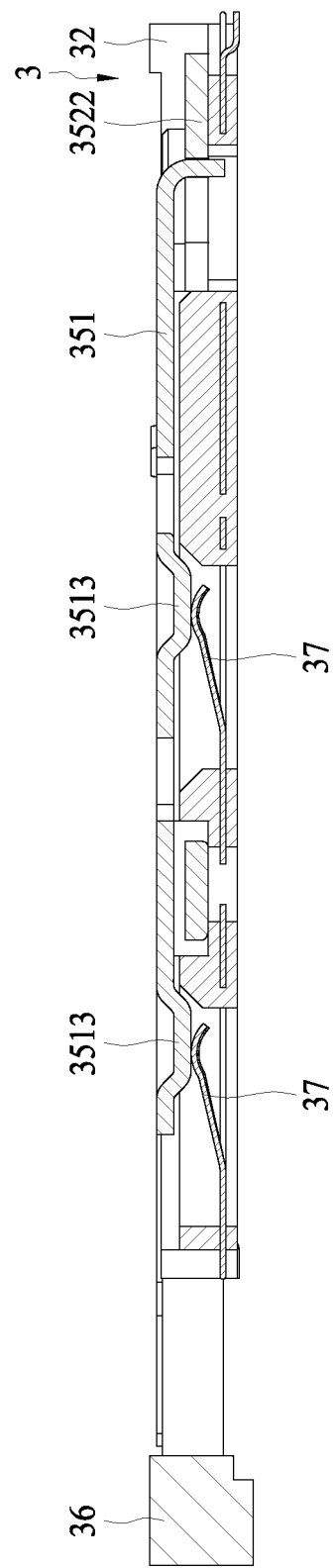
FIG. 19 is a sectional view along line 7-7 of FIG. 17.

As shown in FIGS. 18 and 19, after the actuator 351 contacts the second arm part 3522 of the levering member 352, the levering member 352 is rotated with the inward moving of the actuator 351 pushed by the push member 6. The end portion 35211 of the first arm part 3521 of the rotating levering member 352 pushes the rear side of the tray 36, moving the tray 36 outward until the levering member 352 is rotated to the second position.

Figure 20:
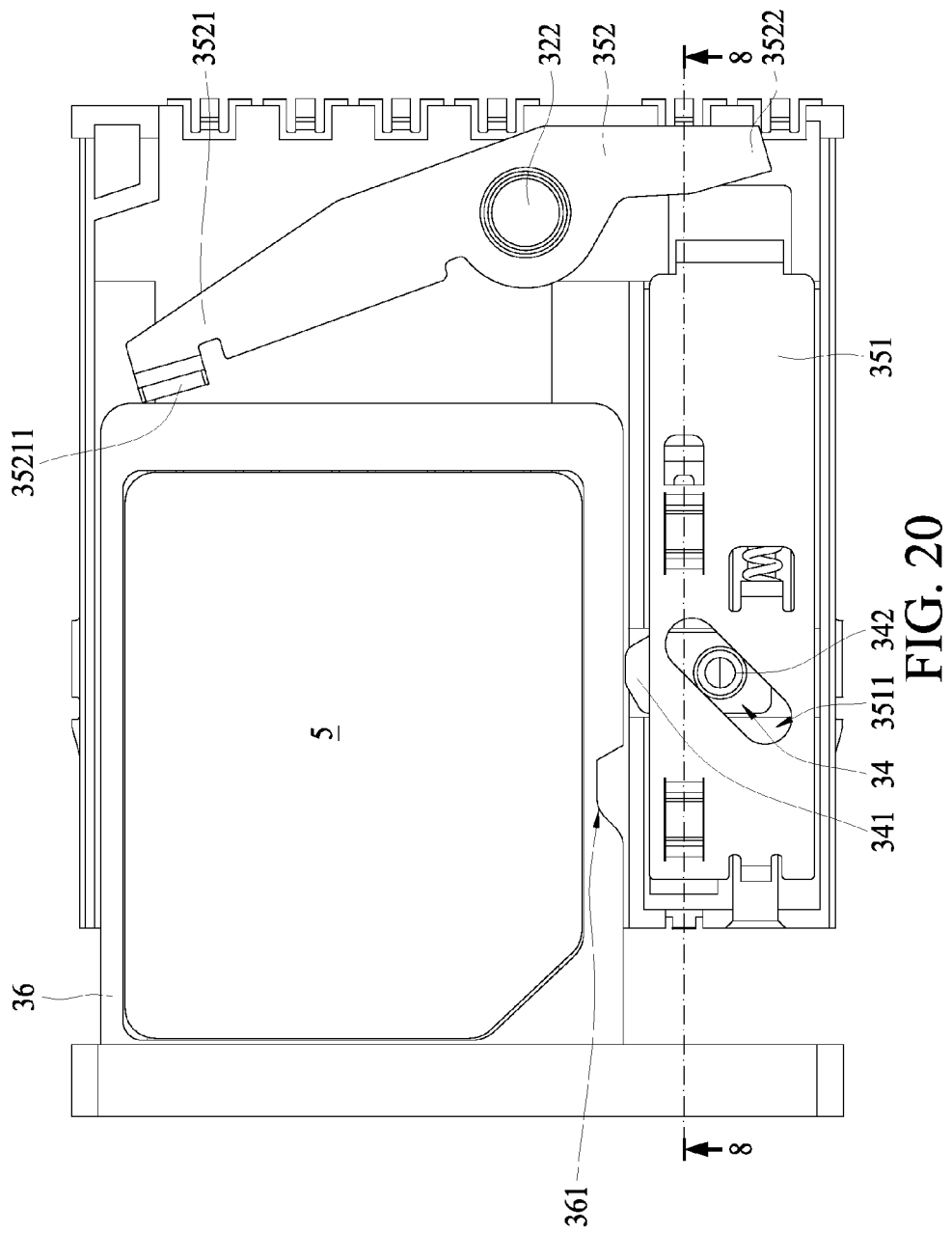
FIG. 20 is a top view showing the card locking element being moved to touch the tray by the actuator moved by the elastic force generated by the elastic member after the push member is removed according to one embodiment of the present invention.
Figure 21:
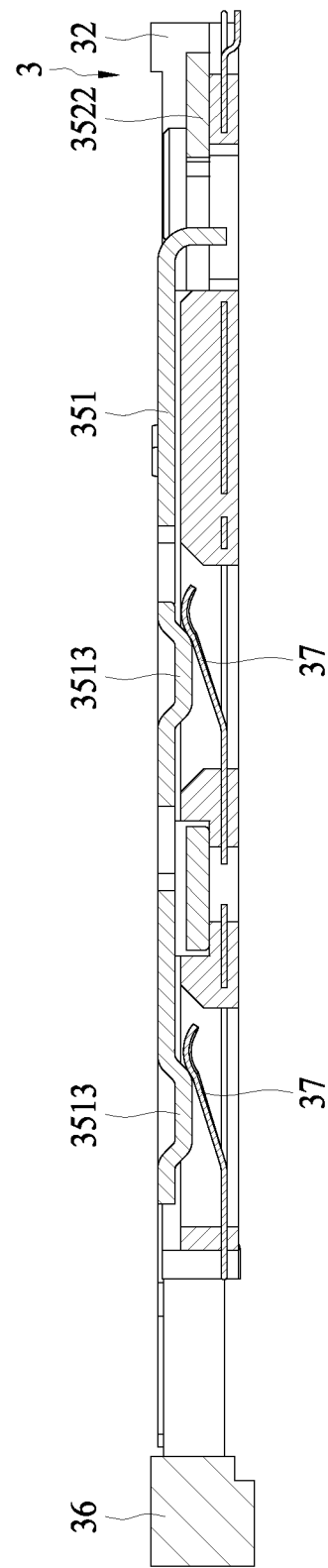
FIG. 21 is a sectional view along line 8-8 of FIG. 20.

As shown in FIGS. 20 and 21, after the tray 36 is ejected at a position as shown in FIG. 18, the push member 6 can be removed. After the push member 6 is removed, the elastic force of the elastic member 353 moves the actuator 351 outward, and the movement of the actuator 351 is stopped when the card locking element 34 touches a side of the tray 36.

Figure 22:
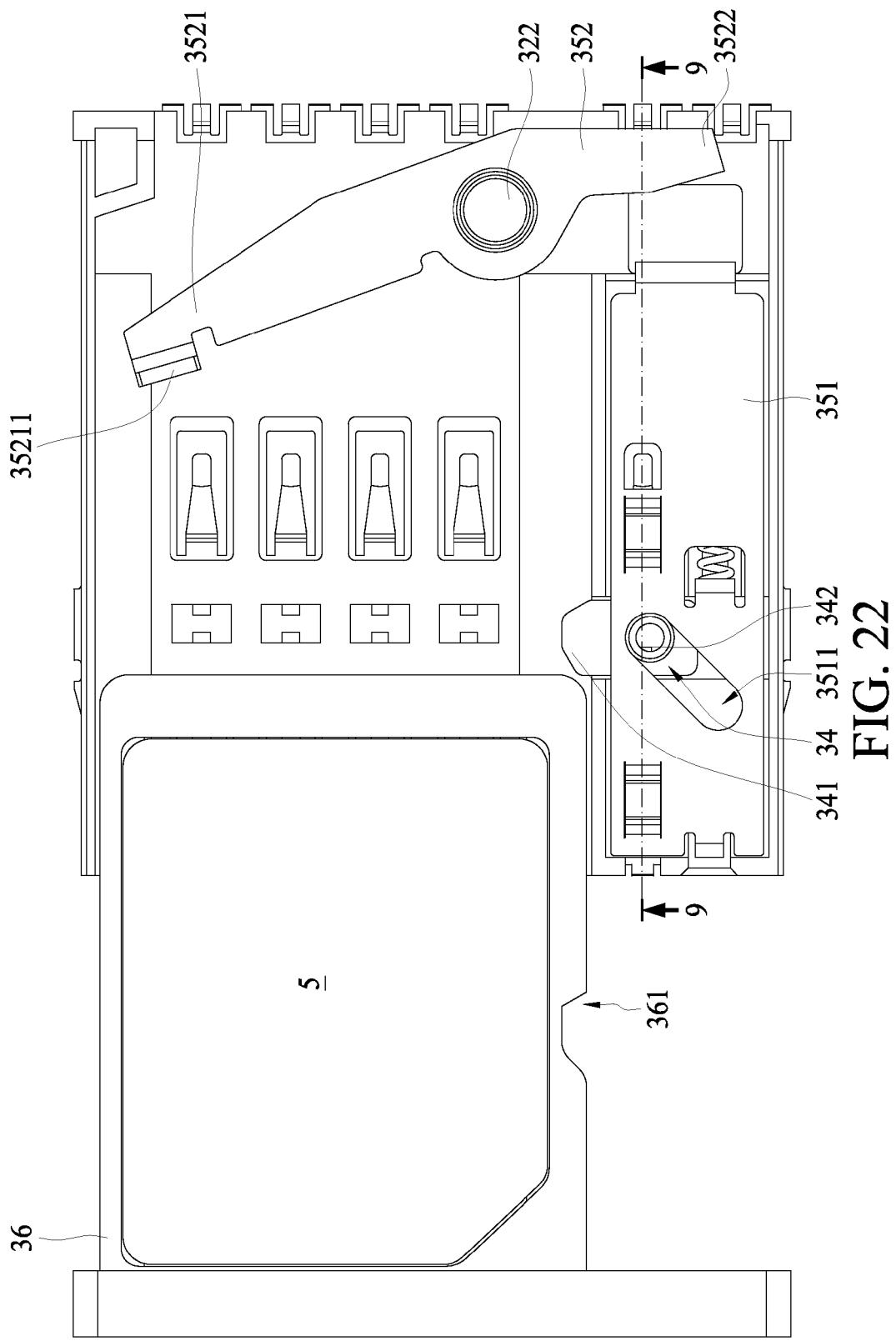
FIG. 22 is a top view showing the actuator moved back to the outward position and the card locking element moved back to the locking position according to one embodiment of the present invention.
Figure 23:
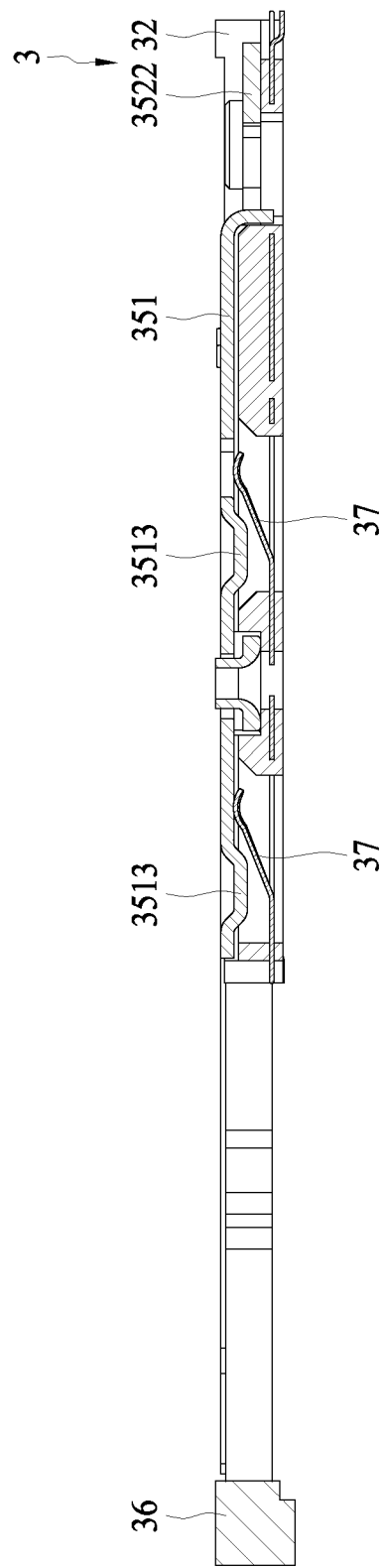
FIG. 23 is a sectional view along line 9-9 of FIG. 22.

As shown in FIGS. 22 and 23, the tray 36 is then manually removed. During the removal of the tray 36, the elastic force of the elastic member 353 furthermore moves the actuator 351 outward when the card locking element 34 does not push against the side of the tray 36. Finally, the actuator 351 is back to the outward position, and the card locking element 34 is back to the locking position.

In addition, during ejection the actuator 351 always contacts the detective terminals 37 when the card locking element 34 pushes against the side of the tray 36. The actuator 351 disengages from the detective terminals 37 when the actuator 351 is moved past the triggering position as shown in FIG. 8, and before the actuator 351 is moved past the triggering position, the contact pads 51 of the electrical card 5 have already disengaged from the respective terminals 33 during the outward movement of the actuator so that the electrical card 5 can be protected.

The card connector comprises an elastic member, a card locking element for latching an inserted tray (or another type of single electrical card without a tray) and a card ejecting mechanism for facilitating the movement of the card locking element between a locking position and an unlocking position. The card locking element can be rigid so that an inserted card or tray can be firmly held. In addition, the card locking element is moved linearly to engage the notch on a card or tray so that the card or tray is not loosely held. Moreover, the card ejecting mechanism comprises an actuator movable between an outward position and an inward position. The elastic member is engageable with the actuator to provide an elastic force counteracting a force moving the actuator inward, moving the actuator outward when the force is removed. Further, the actuator can be made of electrically conductive material so that the actuator can directly contact the detective terminals disposed below the actuator to form a close loop for disabling the terminals. Such a detective switching circuit design is simple and can be applied to any type of connector.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

What is claimed is:

1. A card connector comprising;
a main body formed with a receiving space, the receiving space having a rear portion;
a plurality of terminals attached to the main body;
a card ejecting mechanism comprising:
a levering member pivotally mounted adjacent to the rear portion of the receiving space; and
an electrically conductive actuator movable between an inward position and an outward position and configured to rotate the levering member;
two detective terminals disposed below the actuator, the two detective terminals and the actuator forming a switching circuit for controlling electrical connectivity of the plurality of terminals, wherein, in operation, when the actuator is at an outward position, the plurality of terminals are enabled, and when the actuator is moved toward the inward position beyond a triggering position, the plurality of terminals are disabled; and
a card locking element including a first interacting portion and a locking portion configured to be located in the receiving space when the card locking element is in a locking position;
wherein the actuator includes a second interacting portion configured to engage with the first interacting portion for linked movement of the card locking element and the actuator, wherein the first and second interacting portions allow the movement of the card locking element between the locking position and an unlocking position to be simultaneous with the inward and outward movement of the actuator, and when the actuator is moved to the outward position the card locking element is simultaneously moved to the locking position;
wherein the card ejecting mechanism further comprises an elastic member engageable with the actuator to provide an elastic force counteracting a force moving the actuator inward, and the elastic force moves the actuator to the outward position when the force is removed.

2. The card connector of claim 1, wherein the second interacting portion comprises a slot inclined at an angle of 45 degrees relative to the moving direction of the actuator, and the first interacting portion comprises a pin movable in the slot.

3. The card connector of claim 2, wherein the main body comprises a first recessed area configured for confining the actuator to moving inward and outward, and a second recessed area configured for confining the movement of the card locking element, wherein the first recessed area is disposed adjacent to a side of the main body and the second recessed area traverses the first recessed area.

4. The card connector of claim 3, wherein a distance between the outward position and the triggering position is not greater than the moving distance of the card locking element from the locking position to the unlocking position.

5. The card connector of claim 4, wherein the levering member is rotatable between a first position and a second position, and the levering member comprises a first arm part configured to partially extend in the receiving space when the levering member is at the second position and a second arm part engageable with the actuator, wherein when the levering member is at the first position and the actuator is at the outward position, a distance spaced between the second arm part and the actuator is greater than a moving distance of the card locking element from the locking position to the unlocking position, wherein when the actuator disengages from at least one of the two detective terminals, the plurality of terminals are enabled, and when the actuator engages the two detective terminals, the plurality of terminals are disabled.

6. The card connector of claim 5, further comprising a cover member, wherein the levering member and the actuator are confined between the cover member and the main body, wherein the two detective terminals are disposed along a direction parallel to the moving direction of the actuator, and the actuator comprises two protrusion corresponding to the two detective terminals, wherein, in operation, the two protrusions respectively contact the two detective terminals when the actuator is moved beyond the triggering position.

7. A card connector comprising;
a tray;
a main body formed with a receiving space for receiving the tray, the receiving space having a front portion and a rear portion;
a plurality of terminals attached to the main body;
a card ejecting mechanism for ejection of the inserted tray, comprising:
a levering member pivotally mounted adjacent the rear of the rear portion of the receiving space; and
an electrically conductive actuator movable between an inward position and an outward position and; configured to rotate the levering member; and
two detective terminals disposed below the actuator, the two detective terminals and the actuator forming a switching circuit for controlling electrical connectivity of the plurality of terminals, wherein when the actuator is at an outward position, the plurality of terminals are enabled, and when the actuator, in operation, is moved toward the inward position beyond a triggering position, the plurality of terminals are disabled; and a card locking element including a first interacting portion and a locking portion configured to be in a notch formed on the tray when the card locking element is in a locking position;

wherein the actuator includes a second interacting portion configured to engage with the first interacting portion for linked movement of the card locking element and the actuator, wherein, in operation, the first and second interacting portions allow the movement of the card locking element between the locking position and an unlocking position to be simultaneous with the inward and outward movement of the actuator, and when the actuator is moved to the outward position the card locking element is simultaneously moved to the locking position;

wherein the card ejecting mechanism further comprises an elastic member engageable with the actuator, the elastic member configured to provide an elastic force that, in operation, counteracts a force moving the actuator inward, and the elastic force biases-moves the actuator to an outward position when the force is removed.

8. The card connector of claim 7, wherein the second interacting portion comprises a slot inclined at an angle of 45 degrees relative to the moving direction of the actuator, and the first interacting portion comprises a pin movable in the slot and wherein the main body comprises a first recessed area configured for confining the actuator to moving inward and outward, and a second recessed area configured for confining the movement of the card locking element, wherein the first recessed area is disposed adjacent to a side of the main body and the second recessed area traverses the first recessed area.

9. The card connector of claim 7, wherein the levering member is rotatable between a first position and a second position, and the levering member comprises a first arm part configured to partially extend in the receiving space when the levering member is at the second position for ejection of the tray and a second arm part engageable with the actuator, wherein when the levering member is at the first position and the actuator is at the outward position, a distance spaced between the second arm part and the actuator is greater than a distance between the outward position and the triggering position.

10. The card connector of claim 9, wherein a distance between the outward position and the triggering position is not greater than the moving distance of the card locking element from the locking position to the unlocking position.

11. The card connector of claim 10, wherein the levering member is rotatable between a first position and a second position, and the levering member comprises a first arm part configured to partially extend in the receiving space when the levering member is at the second position for ejection of the tray and a second arm part engageable with the actuator, wherein when the levering member is at the first position and the actuator is at the outward position, a distance between the second arm part and the actuator is greater than a moving distance that the card locking element moves from the locking position to the unlocking position.

12. The card connector of claim 11, wherein when the actuator disengages from at least one of the two detective terminals, the plurality of terminals are enabled, and when the actuator engages the two detective terminals, the plurality of terminals are disabled and wherein the two detective terminals are disposed along a direction parallel to the moving direction of the actuator, and the actuator comprises two protrusions corresponding to the two detective terminals, wherein the two protrusions respectively contact the two detective terminals when the actuator is moved beyond the triggering position.

13. The card connector of claim 12, wherein the plurality of terminals correspond to contact pads of an electrical card received in the tray, wherein, in operation, when the electrical card is being inserted, the contact pads of the electrical card do not contact the plurality of terminals before the actuator is moved beyond the triggering position during the inward movement of the actuator, and the plurality of terminals are enabled after the actuator is moved outward past the triggering position during the outward movement of the actuator.

14. The card connector of claim 13, wherein when the electrical card is being ejected, the electrical card is configured to not move before the actuator is moved beyond the triggering position during the inward movement of the actuator, and the contact pads of an electrical card disengage from the plurality of terminals before the actuator is moved past the triggering position during the outward movement of the actuator.

15. The card connector of claim 14, further comprising a cover member, wherein the levering member and the actuator are confined between the cover member and the main body.

16. A card connector, comprising:
a main body having a receiving space, the receiving space having a rear portion;
a plurality of terminals attached to the main body;
a card locking element including a first interacting portion and a locking portion configured to be located in the receiving space when the card locking element is in a locking position; and
a card ejecting mechanism comprising:
a levering member pivoted adjacent to the rear portion of the receiving space;
an actuator movable between an inward position and an outward position and; configured to rotate the levering member, the actuator having a second interacting portion configured to engage with the first interacting portion for linked movement of the card locking element and the actuator, and
an elastic member engageable with the actuator to provide an elastic force counteracting a force moving the actuator inward, the elastic force configured to bias the actuator to an outward position when the force is removed;
wherein, in operation, the first and second interacting portions allow the movement of the card locking element between the locking position and an unlocking position to be simultaneous with the movement of the actuator between the inward and outward positions, and when the actuator is moved to the outward position the card locking element is simultaneously moved to the locking position, wherein the second interacting portion comprises a slot inclined at an angle of 45 degrees relative to the moving direction of the actuator, and the first interacting portion comprises a pin movable in the slot.

17. The card connector of claim 16, wherein the main body comprises a first recessed area configured for confining the actuator to moving inward and outward, and a second recessed area configured for confining the movement of the card locking element, wherein the first recessed area is disposed adjacent to a side of the main body and the second recessed area traverses the first recessed area.

* * * * *